April 21, 1936.   K. L. HERRMANN   2,038,079
ANTIFRICTION BEARING
Filed Dec. 20, 1934
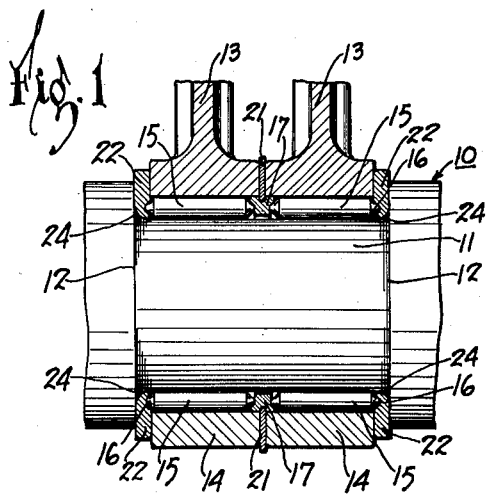
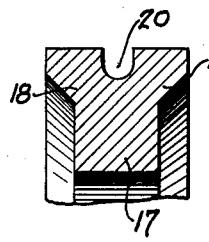
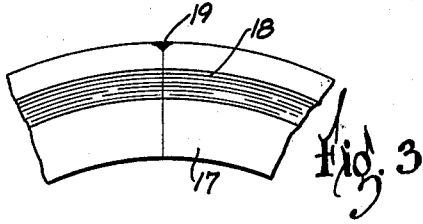
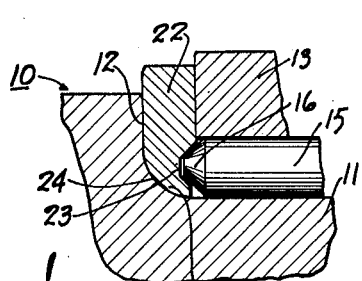
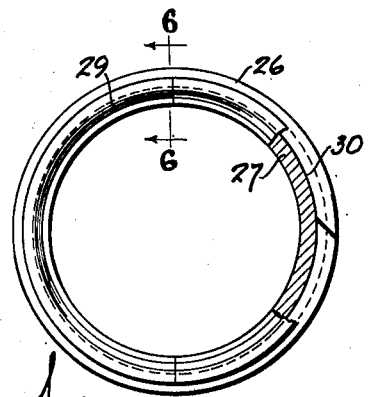
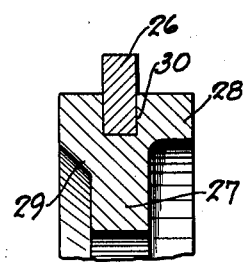
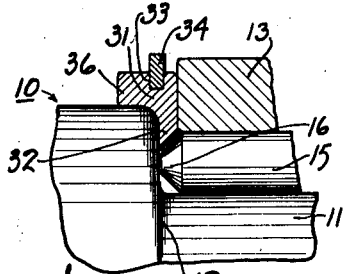
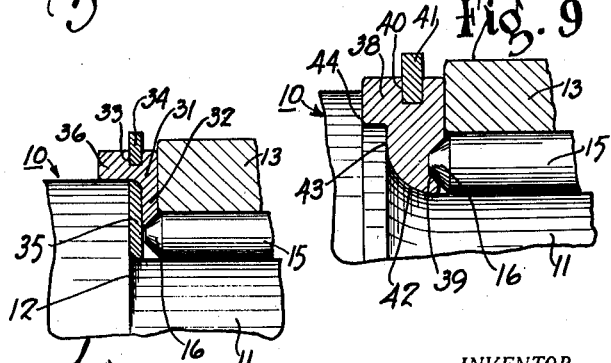
INVENTOR.
Karl L. Herrmann
BY
ATTORNEY.

Patented Apr. 21, 1936

2,038,079

UNITED STATES PATENT OFFICE 2,038,079

ANTIFRICTION BEARING

Karl L. Herrmann, South Bend, Ind., assignor to The Bantam Ball Bearing Company, South Bend, Ind., a corporation of Indiana Application December 20, 1934, Serial No. 758,354

4 Claims. (Cl. 308—207)

This invention relates to roller bearings and particularly to such bearings interposed between an inner race member, such as a crank shaft, and one or more outer race members, such as connecting rods mounted thereon.

The principal object is to provide an anti-friction bearing interposed between a rotatable member, such as a crank shaft, and one or more outer race members, such as connecting rods, together with combined bearing thrust and retaining rings preferably formed in sections encircling the rotatable member, with means for holding the ring sections in assembled position.

Another object is to provide an anti-friction bearing comprising one or more rows of rollers interposed between an inner race member and one or more outer race members mounted thereon, and thrust rings interposed between the ends of the rollers and shoulders formed on the inner race member, the thrust rings being formed in sections and having means for holding the ring sections in assembled position on the inner race member.

A further object is to provide roller retainers formed in a plurality of sections abutting against the ends of a row of rollers and having means for holding the sections in operative position on an inner race member.

A further object is to provide a retainer which also forms a thrust member for a row of rollers encircling an inner race member, such as a crank shaft, which is formed in a plurality of sections having a split ring encircling the sections to maintain the same in operative position to hold the rollers on the inner race member in assembled position before the outer race member is mounted thereon or during disassembly or replacement of the outer race member.

A still further object is to provide a retainer formed in a plurality of sections for a row of rollers having tapered ends encircling an inner race member, the retainer also being provided with an annular recess for supporting the roller ends and forming a thrust member for the rollers.

Other objects and objects relating to details of construction and methods of manufacture will be apparent from the detailed description to follow and from the accompanying drawing in which.

Fig. 1 is a fragmentary sectional view showing a pair of connecting rods mounted on an inner race member, such as a crank shaft, and including one form of my invention incorporated therein.

Fig. 2 is an enlarged detailed sectional view of the thrust ring interposed between the adjacent ends of the spaced rows of anti-friction rollers.

Fig. 3 is a fragmentary side elevational view of the thrust ring shown in Fig. 2, illustrating one means of joining the ring sections together.

Fig. 4 is an enlarged detailed sectional view of the thrust ring shown in Fig. 1 interposed between a shoulder formed on the inner race member and the ends of a row of anti-friction rollers encircling the inner race member.

Fig. 5 is a side elevational view, partly in section, showing a modified means of securing together the sections of the thrust ring shown in Fig. 6.

Fig. 6 is a detailed sectional view taken on the line 6—6 of Fig. 5.

Fig. 7 is a sectional view showing a modified form of the thrust ring shown in Fig. 4.

Fig. 8 is a sectional view showing a modified form of the thrust ring shown in Fig. 7.

Fig. 9 is a sectional view showing still another form of the thrust ring shown in Fig. 4.

I am aware that heretofore others have mounted rollers between an inner race member, such as a crank shaft, and an outer race member, such as a connecting rod, but in so doing considerable difficulty was encountered in providing suitable retaining means for the rollers and also providing suitable thrust members for the ends of the rollers.

I have found it to be of considerable advantage to provide retaining means for rollers which also form thrust members for the ends of the rollers and have provided such a construction in which retaining rings can be mounted and maintained in assembled position between the ends of the rollers and shoulders formed on the inner race member.

Referring to the numbered parts of the drawing in which like numerals refer to like parts throughout the several views, I have shown an inner race member 10, such as a crank shaft, which has a reduced bearing portion 11 having shoulders 12 at the ends thereof. I have illustrated in Fig. 1 a pair of connecting rods 13 encircling one-half of the bearing portion 11 of the crank shaft 10 which are held in position thereon by caps 14, the connecting rods and cap being of a conventional construction as is well understood by those skilled in the art. Also, as illustrated in Fig. 1, are two rows of rollers 15 preferably having tapered ends 16 which are interposed between the connecting rods 13, caps 14 and the crank shaft 10.

Retaining rings for the adjacent ends of the two rows of rollers which also form thrust rings therefor are preferably made in a plurality of sections, as is best shown in Fig. 3, each section having a body portion 17 formed with tapered flanges 18 at opposite sides thereof which extend over the tapered ends 16 of the rollers 15, as is best illustrated in Fig. 1, to prevent that end of the roller from dropping out of the retainer and maintaining the same in assembled position on the crank shaft 10. The sections may be secured together by welding as indicated at 19 in Fig. 3 or the sections may be provided with grooves 20 in which is seated a split ring 21, as shown in Fig. 1.

Retaining ring sections somewhat similar to the retaining ring 17 interposed between the ends of the rows of rollers 15 may be positioned between the outer ends of the rollers 15 and the shoulders 12 formed on the crank shaft 10, each ring section comprising a body portion 22 having an annular tapered groove 23 formed therein adapted to receive the tapered ends 16 of the rollers 15, as is best shown in Fig. 4. As the shoulder 12 formed on the crank shaft 10 is usually formed with a fillet 24, I preferably round the edges of the ring sections 22 at 25 so that the ring sections will firmly seat against the shoulder 12, as is also shown in Fig. 4. The ring sections 22 may be welded together in the same manner as illustrated in Fig. 3 or they may be provided with a groove in which is seated a split ring 26, as shown in Figs. 5 and 6.

While I have shown in Fig. 1 a row of rollers 15 for each connecting rod 13, it is obvious that the retaining ring interposed between the adjacent ends of the rollers 15 can be omitted and that a single row of rollers can be substituted for the double row of rollers so that the respective tapered ends 16 of the single row of rollers 15 are positioned in the tapered grooves 23 of the ring sections 22 and thereby maintained in position on the bearing portion 11 of the crank shaft 10.

In assembling the bearing, the ring sections 22 are mounted on the bearing portion 11 of the crankshaft 10 and then the sections are welded together, as shown in Fig. 6, then a snap ring 26 is inserted around the ring sections 22 so that they are maintained in position against the shoulders 12 formed on the crank shaft 10. In the same manner, if it is desired to use two rows of rollers 15, as illustrated in Fig. 1, the ring sections 17 are placed on the bearing portion 11 of the crank shaft 10, after which they are welded together at 19, as illustrated in Fig. 3, or if they are provided with a groove 20, as illustrated in Fig. 2, then a snap ring 21 is inserted in the groove 20 to maintain the ring sections 17 in assembled position on the bearing portion 11 of the crank shaft 10. After the retaining rings are thus assembled on the crank shaft 10, the rollers are inserted in the tapered raceways 23 formed in the ring sections 22 and beneath the flanges 18 formed on the intermediate ring 17 in the same manner as described and illustrated in my copending application Serial No. 755,347, filed November 30, 1934. After the rollers are thus mounted in the retaining rings heretofore described, the connecting rods 13 are mounted on the rollers and the caps 14 are secured thereto which may be in the same manner as described in my copending application referred to above.

In Figs. 5 and 6, I have shown a slightly modified form of my invention in which the retaining ring sections 27 which are somewhat similar to the ring sections 22, are provided with an outwardly extending flange 28 which seats over the shoulder 12 formed on the crank shaft 10 and on their inner faces are provided with the tapered flange 29 which encircles the tapered ends 16 of the rollers 15, thus retaining the rollers on the crank shaft 10.

The ring sections 27 may be welded together as shown in Fig. 3, or they may have a groove 30 in which is inserted a snap ring 26 to maintain the ring sections in assembled position on the inner race member. It will be observed from Figs. 5 and 6 that in addition to providing a retaining ring for the rollers 15, the body portion 27 forms a thrust member for the ends of the rollers in the same manner as provided in the structure illustrated in Figs. 1 and 4.

In Fig. 7, I have shown a slightly modified form of my invention in which ring sections 31 have inwardly extending flanges 32 interposed between the shoulder 12 formed on the crank shaft 10 and the connecting rod 13, the inner face of the flanges 32 abutting against the tapered ends 16 of the rollers 15. In this construction, the ring sections 31 have an outwardly extending flange 36 which overlies the shoulder 12 formed on the crank shaft 10, each section being provided with a groove 33 in which is inserted a snap ring 34 for maintaining the retaining ring in assembled position on the crank shaft. In the construction shown in Fig. 7, the retaining rings do not include thrust portions but instead the ends of the rollers 15 are adapted to abut the shoulder 12 on the inner race member so that the retaining rings in this construction do not provide for the double function of the retaining rings described in the preceding view.

In Fig. 8, I have shown a slightly modified form of the invention illustrated in Fig. 7 in which the retaining ring is substantially like that shown in the preceding view and in which like numerals refer to like parts but in which I have provided an independent thrust ring 35 which is interposed between the ends of the rollers 15 and the shoulder 12 on the crank shaft 10 to provide a wear plate for the rollers. In this construction, the thrust ring 35 is preferably formed in section in the same manner as the ring sections 31; however, the sections of the thrust ring 35 need not be secured together as they will be maintained in assembled relationship by the retaining ring 31 when the snap ring 34 is inserted in the slot 33 of the respective ring sections to maintain the respective parts together.

In Fig. 9, I have shown a still further form of my invention in which the ring sections 38 are each provided with a tapered recess 39 to receive the ends 16 of the rollers 15, each of the ring sections 38 being provided with a groove 40 in which is inserted a snap ring 41 to maintain the ring sections in position as described in the preceding view. In this construction, the bearing portion 11 of the inner race member is formed with a fillet 42 which terminates in a shoulder 43 and which has a second shoulder 44 so that the retaining ring sections abut against both the shoulders 43 and 44, as is clearly shown. Also, in this construction, the retaining rings also provide thrust members for the ends of the rollers 15 in the same manner as is illustrated particularly in Figs. 1 and 4.

It will thus be seen that I have provided a bearing assembly which is economical to manufacture and in which the retaining rings for the rollers form the dual function of providing thrust rings therefor and in which the rollers and rings can be assembled and disassembled for a minimum amount of expense, and in which the connecting rods and crank shafts may be of conventional design so that no special machining need be done on either the connecting rods or crank shaft.

While I have shown several embodiments of my invention, it will be understood to those skilled in the art that various changes may be made without departing from the spirit and substance of my invention, the scope of which is to be measured entirely by the subjoined claims.

What I claim is:

1. In an anti-friction bearing, an inner race member having shoulders formed thereon, an outer race member, a full row of rollers encircling said inner race member positioned between said shoulders, and combined retainers for said rollers and thrust members for said outer race member interposed between said outer race member and the respective shoulder on said inner race member surrounding the rollers adjacent to the ends thereof, said combined retainers and thrust members being removable from said bearing without removing said outer race member.

2. In an anti-friction bearing, an inner race member having shoulders formed thereon, an outer race member, a full row of rollers having tapered ends encircling said inner race member positioned between said shoulders, and combined retainers for said rollers and thrust members for said outer race member interposed between said outer race member and the respective shoulder on said inner race member engageable with the tapered portions and the ends of said rollers, said combined retainers and thrust members being removable from said bearing without removing said outer race member.

3. In an anti-friction bearing, an inner race member having shoulders formed thereon, an outer race member, a full row of rollers having tapered ends encircling said inner race member positioned between said shoulders, and combined retainers for said rollers and thrust members for said outer race member having a portion overlapping said shoulder and a portion interposed between said outer race member and the respective shoulder on said inner race member engageable with the tapered end portions and the ends of said rollers, said combined retainers and thrust members being removable from said bearing without removing said outer race member.

4. In an anti-friction bearing, an inner race member having shoulders formed thereon, an outer race member, a full row of rollers having tapered ends encircling said inner race member positioned between said shoulders, and combined sectional retainers for said rollers and thrust members for said outer race member, said retainer sections each having a portion overlapping the shoulder on said inner race member and a portion interposed between said outer race member and shoulder, said last named portion having a tapered face engageable with the tapered end portions of said rollers, said combined retainers and thrust members being removable from said bearing without removing said outer race member.

KARL L. HERRMANN.